United States Patent [19]

Campanella et al.

[11] 3,780,233

[45] Dec. 18, 1973

[54] ADPATIVE ECHO CANCELLERS WITH COMPANDORS

[75] Inventors: Samuel J. Campanella, Gaithersburg; Henri G. Suyderhoud, Potomac; Michael Onufry, Jr., Gaithersburg, all of Md.

[73] Assignee: Communications Satellite Corporation, Washington, D.C.

[22] Filed: Sept. 20, 1971

[21] Appl. No.: 181,779

[52] U.S. Cl. .......... 179/170.2
[51] Int. Cl. .......... H04b 63/20
[58] Field of Search .......... 179/170.2

[56] References Cited

UNITED STATES PATENTS 3,500,000 3/1970 Kelly .......... 179/170.2
2,825,764 3/1958 Edwards .......... 179/170.2

*Primary Examiner*—Ralph D. Blakeslee
*Attorney*—Richard C. Sughrue et al.

[57] ABSTRACT

An echo canceller with compandors results in improved echo return loss enhancement. The incoming signal is compressed prior to its application to a digital transversal filter. The filter produces an approximation of the integral of the syllabically compressed incoming signal times a replica of the impulse response of an echo return path including a compressor. The echo signal is also syllabically compressed and applied to an adaptive control loop wherein the approximation is subtracted from the echo and the replica of the impulse response is varied in accordance with the difference obtained.

5 Claims, 5 Drawing Figures

INVENTORS
SAMUEL J. CAMPANELLA
HENRI G. SUYDERHOUD
MICHAEL ONUFRY, JR.

BY Sughrue, Rothwell, Mion, Zinn & Macpeak

ATTORNEYS

ADPATIVE ECHO CANCELLERS WITH COMPANDORS

BACKGROUND OF THE INVENTION

The invention is in the field of echo cancellers and in particular is an improved echo canceller.

It is well known that hybrid circuits connecting two wire to four wire circuits do not provide echo free coupling between the receive and send lines of the four wire circuit. A portion of the signal, typically voice signals, on the receive line will pass to the send line and appear as an echo signal When the four wire system is used for long distance communications, such as via a submarine cable or a communications satellite, the echo signal can be particularly disturbing.

Echo suppressors are commonly used for removing the echo caused by imperfection in the hybrid or other echo path by attenuating the send line signal. One class of such suppressors operates to interrupt the send line whenever a voice level signal is detected on the receive line. This will eliminate echo but will also eliminate voice signals emanating from the local two wire circuit and therefore clip the outgoing conversation. A double talk detector is conventionally used to reduce interruption of the send line, normally caused by voice signals on the receive line, when voice signals are simultaneously emanating from the two wire circuits, i.e., speakers at both ends are talking simultaneously. However, if the speaker at the local two wire circuit is speaking softly relative to the speaker at the far end, the larger voice signal on the receive line may prevent operation of the double talk detector and thus the send line will be interrupted thereby clipping the speech on the send line. When the double talk detector does operate correctly, the echo will not be prevented during double talk, but is transmitted along with the near talker speech.

A newer class of devices for handling the echo problem is known as echo cancellers. An echo canceller does not interrupt the send line but generates an approximation, $\hat{y}(t)$, of the echo $y(t)$, and subtracts the former from the signal appearing on the send line. The remaining signal on the send line during double talk is $S(t)+e(t)$, where $S(t)$ is the local voice signal and $e(t)$ is the residual error caused by $\hat{y}(t)$ not being exactly equal to $y(t)$.

The basis of operation of echo cancellers is that the echo path may be regarded as a filter and satisfies the relation:

$$y(t) \int_0^\infty f(t-\tau)k(\tau)d\tau,$$

where $f(t)$ is the signal applied to the echo path, $k(\tau)$ is the impulse response of the echo path, and $y(t)$ is the echo.

In one particular implementation of the above equation, digital circuits are used. An X memory stores digitized samples of the incoming signal $X(t)$ over a period T, and an H register stores a digital representation of the impulse response of the echo path. Both memories recirculate, but the oldest sample in the X memory is replaced, each sample period, by a new sample of the signal $X(t)$. Digital convolution is performed on the contents of the two memories — the contents are multiplied, sample by sample, and the products summedresulting in an approximation of $\hat{y}(t)$ of the echo. In one case, the impulse response of the echo path is stored in the H memory by using the search or interrogating pulse technique. That is, after the circuit is set up between caller and called stations, but before conversation begins, an artificial search or interrogating pulse is applied to the receive line. The pulse passes through the echo path and the resultant signal on the send line is the impulse response of the echo path. The impulse response is sampled over the period T, digitized and stored in the H register.

For a number of reasons, including the fact that the impulse response of the echo path will not be constant, the search pulse technique is not satisfactory. More recent cancellers continuously compute an impulse response that minimized the mean squarred error between $y(t)$ and $\hat{y}(t)$. Specifically, the circuitry includes an adaptive control loop, responsive to the residual error, $e(t)$ and the receive side signal $x(t)$, for implementing the steepest-decent technique by adjusting the N samples of the H memory through incrementing or decrementing each sample by a given amount. After convergence, i.e., attainment of minimum error or echo, the contents of the H memory represent, in digital form, the impulse response of the echo path. The time of convergence and amplitude of residual echo, $e(t)$, are important characteristics in any echo canceller.

SUMMARY OF THE INVENTION

The processing inside the echo canceller is linear, since it performs a real time convolution of the two signals $x(t)$ and $h(t)$. The above described echo canceller is improved by the addition of non-linear elements thereto without degrading the linear through transmission performance. Syllabic compandors (compressors and expanders) of known type are used to achieve faster convergence and lower residual echo. Compandors are well known in the art. A detail description of these devices may be found in U. S. Pat. No. 1,565,548 issued on Dec. 15, 1925 to A. B. Clark and in U. S. Pat. No. 1,738,000 issued to E. I. Green on Dec. 3, 1929. Compandors include a compressor at the transmitting end of a four wire system which operates to raise the level of signals of lower amplitude above the noise level of the communications medium before transmission to the medium and an expandor at the receiving end of the four-wire system which operates in the reverse manner to restore the receive signals to the original relative amplitudes which they possessed at the transmitting end. The incoming signal to the echo canceller is compressed before application to the digital transversal filter. The signal on the send side of the hybrid is also compressed before application to the adaptive control loop. The compressed input allows more nearly optimum performance of the digital transversal filter, and the compressed echo provides improved signal to noise ratio for operation of the adaptive control loop. Expanders convert the compressed signals back to their proper condition for listening by the caller and the called stations.

DETAILED DESCRIPTION OF THE DRAWINGS

Figure 1:
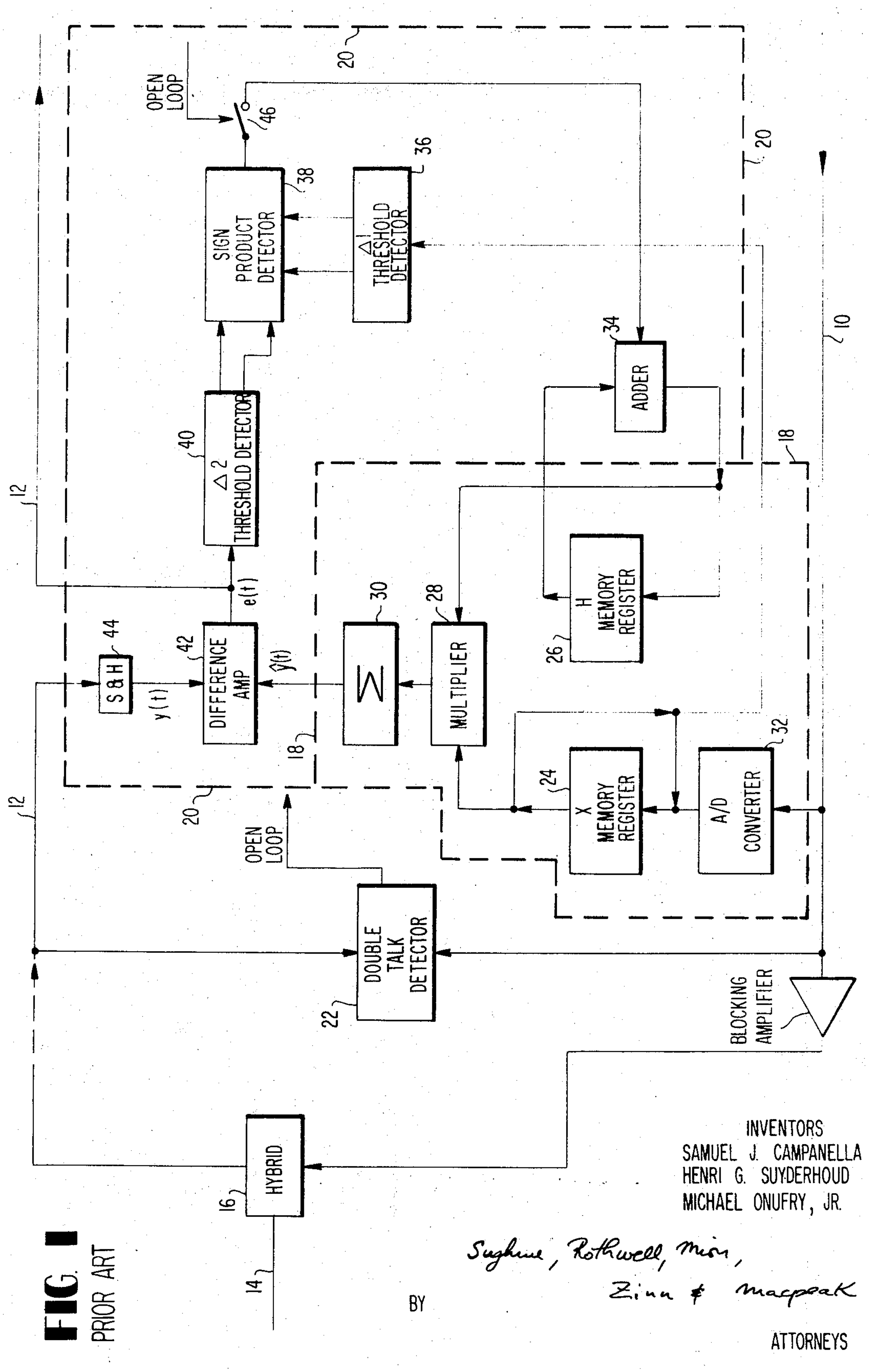
FIG. 1 PRIOR ART
FIG. 1 is a block diagram of a prior art echo canceller which is improved by the present invention.

The block diagram shown in FIG. 1 represents an echo canceller of the prior art type. The four wire circuit comprising receive line 10 and send line 12 is connected to the two wire circuit 14 by a hybrid circuit 16. The echo path is defined as that path from the receive-out side via hybrid 16 to the send-in side of the echo canceller. The two major components of the canceller are a digital transversal filter 18 and an adaptive control loop 20.

The digital transversal filter, 18, comprises an analog to digital converter 32 which samples the incoming signal $X(t)$ at the Nyquist rate and converts each sample into an n-bit digital word, an X memory register which stores N samples of $X(t)$, $x_1$ through $x_N$, and recirculates once each sample period, an H memory register which stores N digital words, $h_1$ through $h_N$, representing the echo path impulse response, a multiplier 28 for multiplying $x_i$ by $h_i$, and a summation circuit, 30, for summing the multiplier output over the sample period. The output of the summation circuit, 30, is an approximation $y(t)$ of the echo $\hat{y}(t)$.

The H memory 26 is initially $h_i = 0$ for $i = 1, 2, 3, \ldots N$. Digital convergence is provided by the adaptive control loop, 20, which comprises: a sample and hold circuit 44, for sampling the echo $y(t)$, appearing on the send line 12; a difference amplifier 42 for receiving $\hat{y}(t)$ and $\hat{y}(t)$ and deriving the residual echo, $e(t)$; a $\Delta_2$ threshold circuit, 40, for determining if $|e(t)|$ is above a minimum amplitude $|\Delta 2|$ and for providing an output indicating the sign of $e(t)$ when $|e(t)|$ exceeds the threshold; a $\Delta 1$ threshold circuit 36 for detecting if $|x_i|$ exceeds the threshold $|\Delta 1|$ and for providing an indication of the sign of $x_i$ when the threshold is exceeded; a sign product detector, 38 for providing an output indicative of the sign product of $x_i$ and $e(t)$; an adder, 34, for adding or subtracting an incremental amount, $\Delta h_i$, to the sample $h_i$ to form the new sample $h_i^* = h_i \pm \Delta h_i$.

In order to prevent the adaptive control loop from responding to $S(t) + e(t)$, which will occur when $S(t)$ and $X(t)$ occur simultaneously, a conventional double talk detector 22 may be used. The detector 22 is not used in the conventional manner to interrupt the send line, but is used to open the adaptive control loop as indicated generally at 46. It will be noted that when the adaptive control loop 20 is opened, the signal $y(t)$ continues to be subtracted from $S(t) + y(t)$, however, the H memory is not updated.

In the cancellers described above, the values of $\Delta 1$ and $\Delta 2$ have practical lower bounds because of their relationship to both the speed of converging to minimum echo and the stability of the convergence algorithm which utilizies the steepest-decent method. Small values for $\Delta 1$ and $\Delta 2$ are theoretically desirable. A small value for $\Delta 1$ increases the speed of convergence, and a small value of $\Delta 2$ reduces the residual echo level in addition to increasing the speed. However, practical limits are imposed by the fact that false corrections may take place in the updating circuit and jeopardize the stability when low signal levels, relative to noise, are present. Implementation of the invention will substantially reduce these limitations and thus result in increased enchancement of echo loss in a shorter time.

Figure 2:
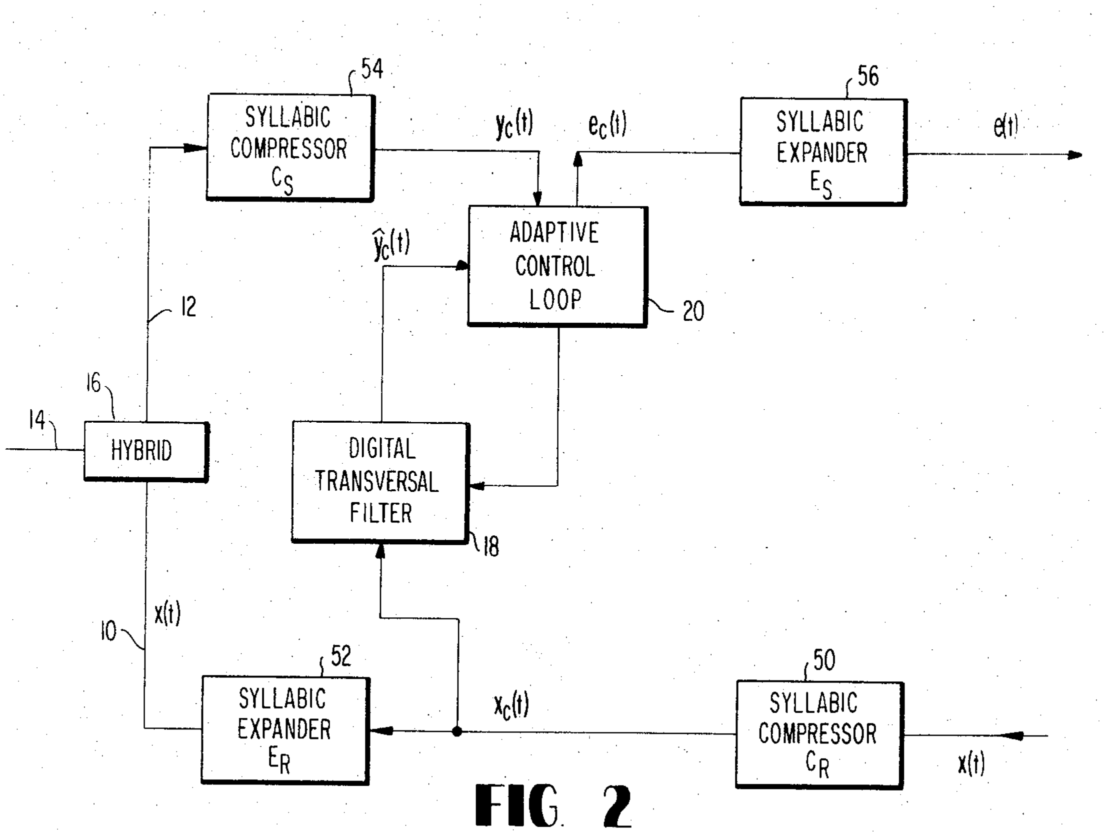
FIG. 2 is a block diagram of the improved echo canceller of the present invention.

In the embodiment shown in FIG. 2, the prior art canceller is illustrated generally by the blocks bearing the same numerals as in FIG. 1. The double talk detector is not illustrated, but may be present to break the adaptive control loop at certain times. The improvement comprises the addition of a known type of compandor to the receive and send lines. A syllabic compressor 50 and syllabic expandor 52 are included in the receive line, and a syllabic compressor 54 and syllabic expandor 56 are included in the send line. The compressor 50 compresses $X(t)$ to form $X_c(t)$ in a known manner. The latter signal is applied as the input to the digital transversal filter. Similarly, the echo, $y(t)$, is compressed to form $y_c(t)$, the latter being applied to the differential amplifier of the adaptive control loop 20. Furthermore, $\hat{y}_c(t)$ is the result of convolving $X_c(t)$ with a modified model of the impulse function of the echo path response which is designated $\hat{h}_c(t)$. The modified model, $\hat{h}_c(t)$, reflects the inclusion of expandor 52 and compressor 54 to the echo path, which is still essentially linear.

The through transmission of the desired speech signals is unchanged in both directions since expansion follows compression prior to transmission of desired speech to the local or distant stations. However, a reduction in noise internally generated by the canceller will result. The invention increases the speed of convergence for a minimum level echo. This comes about because the output, $X_c(t)$, of compressor 50 constitutes a signal with a more restricted amplitude distribution than that of $X(t)$. Thus, since $X_c(t)$ is threshold detected in the adaptive control loop, the frequency with which a given threshold value will be exceeded will be relatively constant even with wide variations in the level of $X(t)$. This permits more nearly optimized operation of the adaptive loop.

Additionally, the echo return loss enhancement — reduction of echo level due to canceller action — will be increased and will accommodate a wide dynamic range of the receive signal $x(t)$. This is the result of three factors. The echo signal, $y(t)$, is relatively small, but after compression the signal, $y_c(t)$, is significantly larger. The larger, $y_c(t)$, forces the modified impulse response, $h_c(t)$, to be larger and thus operate in a more favorable S/N range. Also, since $y_c(t)$ has a more restricted amplitude distribution than $y(t)$, the amount of cancellation will be more uniformly near optimum as a function of the signal level. Finally, the residual echo, $e_c(t)$ after cancellation is relatively small, and since it is created between compressor 54 and expandor 56 the full advantage of the companding action will be gained and thus result in an even lower echo signal $e(t)$ at the output of expandor 56.

Figure 3:
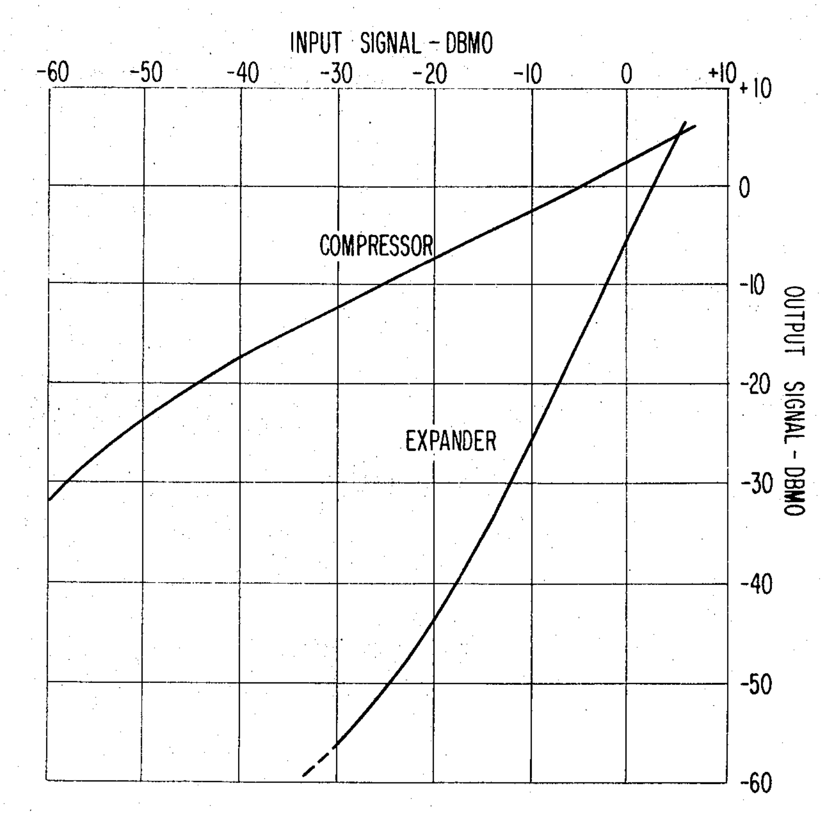
FIG. 3 is a graph showing the input/output characteristics of a typical compandor usable with the present invention.

The following numerical example will illustrate the increased echo return loss enhancement due to the compandor in the send line. Assume that the input/output characteristics of the compressor and expander are as shown in FIG. 3. Assume further than a talker speaks with an average power of −17dBmO, i.e., $X(t) = -17$dBmO. If it is then assumed that the echo return loss of the echo path is 9dB, the value of the echo signal $y(t)$ at the input to the compressor 54 will be −26dBmO. Referring to the compressor input/output characteristics as shown in the graph of FIG. 3, an input of −26dBmO to the compressor 54 results in a compressed echo signal, $y_c(t)$, at the output of compressor 54 of −10dBmO. If the canceller reduces the signal by an additional 20dB then the input to the expandor $e_c(t)$ is −30dBmO. Referring to the expandor input/output characteristic as shown in the graph of FIG. 3, an input of −30dBmO to the expandor 56 results in an expanded echo signal $e(t)$ of −56dBmO on the output side of expander 56. Without the compandor the value $e(t)$ would be −46dBmO) (20dB down from the input level to the canceller, −26dBmO). Thus a 10dB improvement in cancellation enhancement is gained by the compandor. The 10dB improvement is a conservative estimate because the compandor additionally improves the effectiveness of the canceller operation, as described above.

Figure 4:
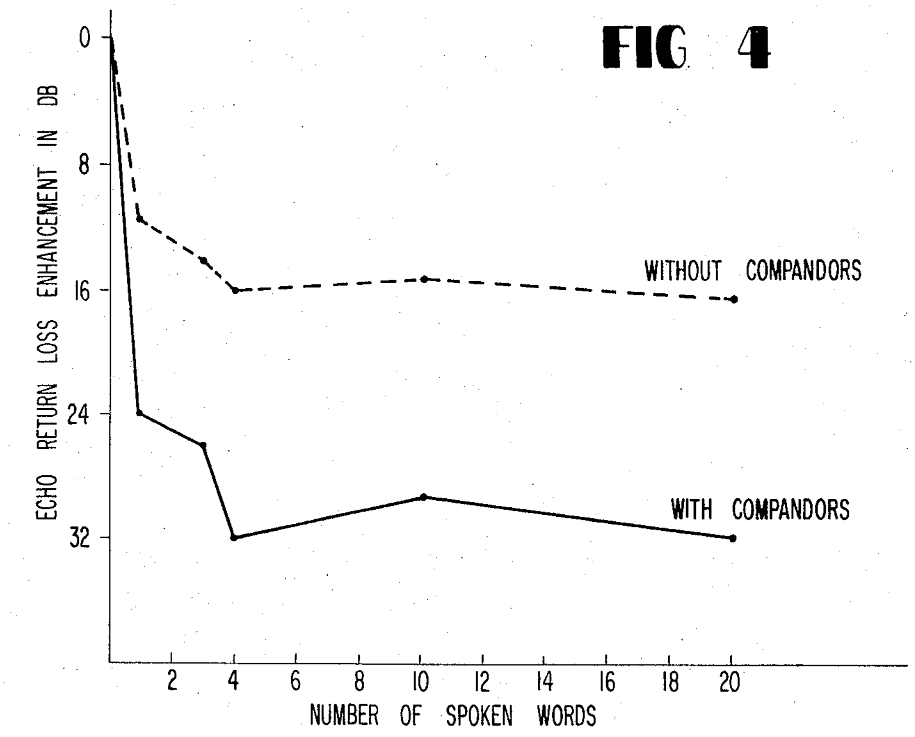
FIG. 4 is a graph of convergence versus the number of words spoken.

An echo canceller incorporating compandors, as illustrated in FIG. 2, was constructed and compared with the same canceller without compandors. Convergence was measured as a function of the number of words spoken and is plotted in FIG. 4 for a 6dB flat echo path. It can be seen that the cancellation enhancement more than doubles after utterance of only one word, and that the final enhancement is twice the value of that obtained without the implementation of the present invention.

Figure 5:
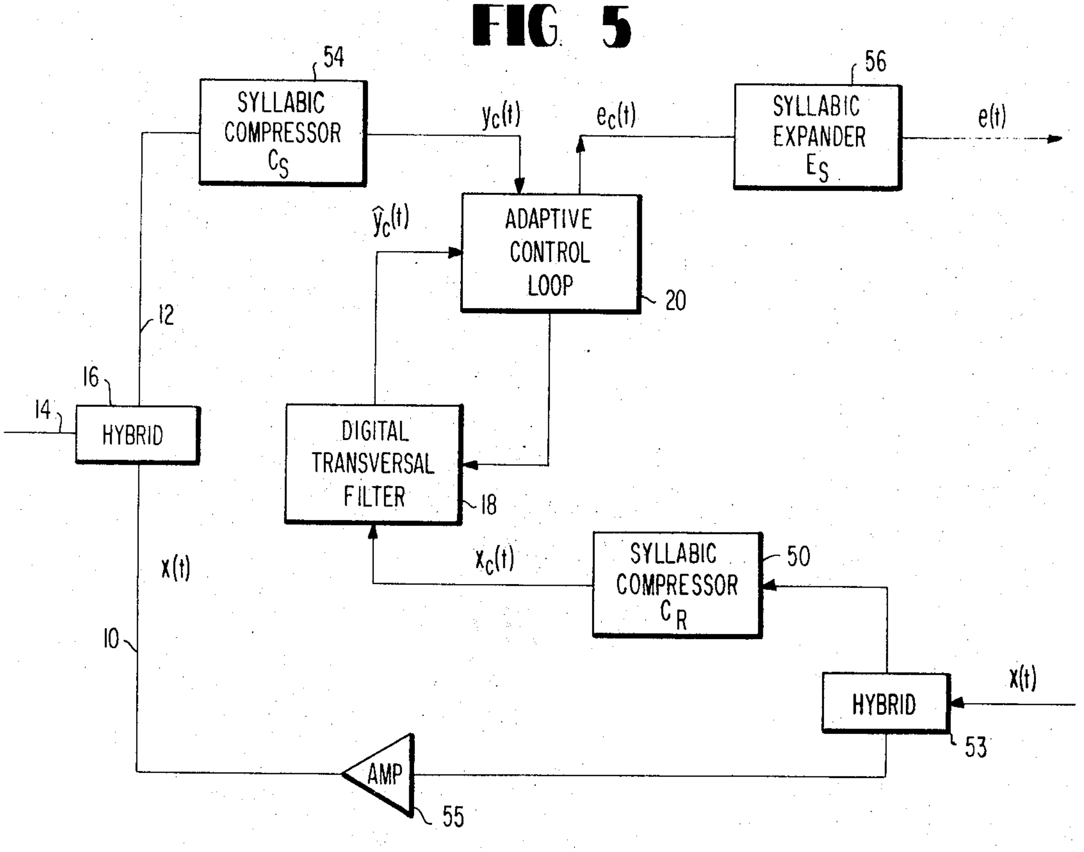
FIG. 5 is a block diagram of an alternate embodiment of the present invention.

An alternative embodiment of the invention is illustrated in FIG. 5. This embodiment has one less expander. The receive signal X($t$) is applied to a hybrid circuit 53 which power divides X($t$) and applies an attenuated X($t$) to the compressor 50. An amplifier 55 restores the level of X($t$) for application to the two wire circuit 14 via hybrid 16. The additional expander is not needed since an uncompressed X($t$) is on the line connected to hybrid 16.

What is claimed is:

1. In an echo canceller of the type which includes, a transversal filter means for performing convolution of an input signal on a receive line and a replica of the impulse response of an echo path to generate an approximation of an echo signal for subtraction, in a subtraction means, from the real echo signal on the send line, and an adaptive control loop responsive to the residual echo resulting from said subtraction to update the replica of the impulse response stored in the transversal filter, the improvement comprising:

a. means connected to the send line on the input side of said subtraction means for increasing the power of the echo signal, and b. means connected to said send line on the output side of said subtraction means for reducing the power of said residual echo.

2. An echo canceller as claimed in claim 1 further comprising means connected between said receive line and said transversal filter for reducing the amplitude distribution of said input signal.

3. An echo canceller as claimed in claim 1 wherein said means for increasing the power is a syllabic compressor, and said means for decreasing the power is a syllabic expander having the reverse input/output characteristic of said compressor.

4. An echo canceller as claimed in claim 3 further comprising a second compressor connected in said receive line at a point prior to the application of signals on said receive line to said transversal filter, and a second expandor connected in said receive line at a point subsequent to the application of signals on said receive line to said transversal filter, said second syllabic compressor and second syllabic expander having reverse input/output characteristics.

5. An echo canceller as claimed in claim 3 further comprising, a power divider means connected to said receive line for providing two attenuated replicas of signals appearing on said receive line, and a second syllabic compressor connected to said power divider and said transversal filter for compressing the signal from said power divider and applying the compressed signal to said transversal filter.

* * * * *